United States Patent [19]

Nebelung et al.

[11] Patent Number: 4,921,523

[45] Date of Patent: May 1, 1990

[54] MECHANISM FOR OPENING AND CLOSING AT LEAST ONE MOULD OF A GLASSWARE FORMING MACHINE

[75] Inventors: Hermann H. Nebelung, Winsen/Luhe; Rune Andersson, Dusseldorf, both of Fed. Rep. of Germany

[73] Assignee: Emhart Industries, Inc., Hartford, Conn.

[21] Appl. No.: 324,159

[22] Filed: Mar. 16, 1989

[30] Foreign Application Priority Data

Mar. 31, 1988 [GB] United Kingdom ................ 8807736

[51] Int. Cl.[5] .......................... C03B 9/34; C03B 9/353
[52] U.S. Cl. ....................................... 65/172; 65/357; 92/128; 92/164
[58] Field of Search ................ 65/171, 172, 357, 359, 65/360; 92/128, 164; 137/315

[56] References Cited

U.S. PATENT DOCUMENTS

| 1,911,119 | 5/1933 | Ingle | 65/360 |
| 3,238,890 | 3/1966 | Sadler et al. | 92/164 |
| 4,449,996 | 5/1984 | Irwin et al. | 65/360 |

*Primary Examiner*—Joye L. Woodard
*Attorney, Agent, or Firm*—Spencer T. Smith

[57] ABSTRACT

The mechanism comprises a piston and cylinder assembly operable to move mould side portion supports between mould open and mould closed positions thereof. A check valve (72, 74, 76, 78, 80, 82) is mounted in a passage (66) into the cylinder to allow fluid under pressure to enter the cylinder through the passage but to prevent exit of fluid through the passage. The check valve is mounted in a chamber (66f) defined partially by the end cap (60) and partially by a cover member (67) removably mounted on the top of the end cap (60). When the cover member (67) is removed from the end cap (60), the check valve can be removed.

2 Claims, 1 Drawing Sheet

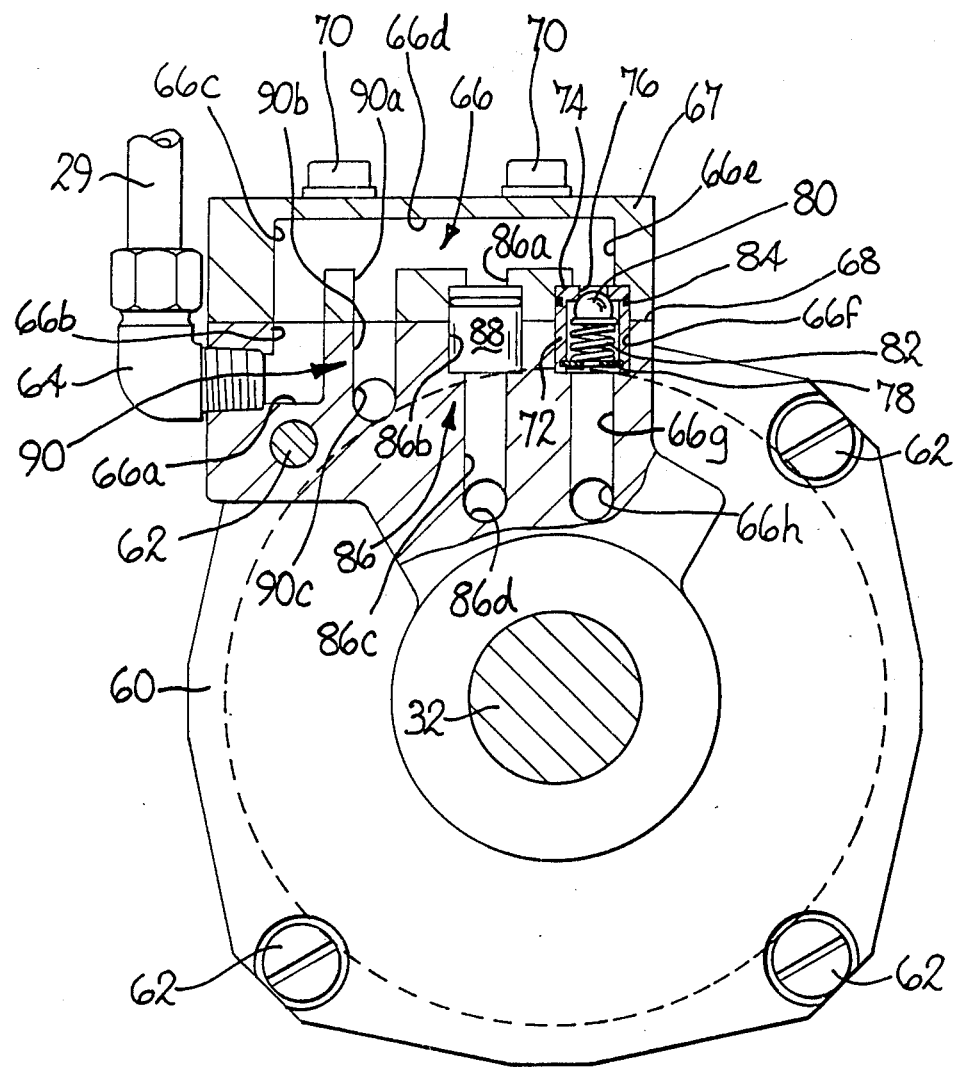

MECHANISM FOR OPENING AND CLOSING AT LEAST ONE MOULD OF A GLASSWARE FORMING MACHINE

BACKGROUND OF THE INVENTION

This invention is concerned with a mechanism for opening and closing at least one mould of a glassware forming machine of the individual section type.

The glassware forming machine of the individual section type is the dominant machine in the World for producing glassware containers such as bottles and jars. The principle of the machine is described in U.S. Pat. No. 1 911 119 in relation to a four-section machine whereas today six, eight, ten or even twelve-section machines are in use. Each section is an individual container-producing unit and has one or more blank moulds to which gobs of molten glass are fed to be moulded into parisons, and a like number of final moulds in which parisons are moulded into complete containers. The sections of a machine receive gobs in turn from a common source, operate in phased relationship to one another, and their output is delivered to a common conveyor.

Each section of a machine of the individual section type comprises a mechanism for opening and closing its blank mould or moulds and another similar mechanism for opening and closing its final moulds. Each such mechanism comprises a pneumatic piston and cylinder assembly having a piston rod, mould side portion supports arranged to support opposed side portions of at least one mould and movable between mould closed positions in which the side portions cooperate in defining a mould cavity in which molten glass can be moulded and mould open positions in which the side portions are separated, and a linkage system connecting said piston rod to said mould side portion supports arranged so that operation of the piston and cylinder assembly causes the supports to move between their mould open and mould closed positions. In the aforementioned U.S. Pat. No. 1 911 119, the mechanism of the blank mould (1) comprises a piston and cylinder assembly (28, 31) having a piston rod (32) operable to move supports in the form of holders (14) arcuately about a pivot shaft (25). The linkage comprises a link (33) pivoted to the piston rod (32), a three-armed rocking beam (34) one arm of which is pivoted to the link (33), links (35 and 36) pivoted to the other arms of beam (34), two vertical operation shafts (38) one adjacent each holder (14), two cranks (37) each secured to one of the shafts (38) and pivotally connected to one of the links (35 and 36), two cranks (40) each secured to one of the shafts (38), and two links (42) each pivotally connected to one of the cranks (40) and one of the holders (14).

As also described in U.S. Pat. No. 1 911 119, it is desired to start the motion of the mould side portion supports towards their mould closed positions at the maximum possible speed while cushioning the end portion of the motion towards their mould open positions. To this end, the air inlet passage (29) into one end cap of the cylinder (28) divides into two branch passages (52 and 53) one (52) of which is throttled by a plug (50) mounted on the piston (31) as the piston approaches the end of its stroke and the other of which contains check valve means (54) mounted in the passage into the cylinder. The check valve means is arranged to allow air under pressure to enter the cylinder (28) through the passage (53) to cause the supports to be moved towards their mould closed positions but to prevent exit of air through said passage. The check valve means comprises a closure member (54) and resilient means in the form of a spring urging the closure member into a position in which it closes said passage. The closure member (54) is displacable against the action of the spring by air pressure in the passage (53) to allow air to pass into the cylinder. The check valve means is mounted in a chamber defined by the end cap of the cylinder. Thus, air can enter the cylinder through the passage (53) and, once the plug (50) has left the passage (52), through the passage (52) but can only leave through the passage (52) so that the plug (50) entering the passage (52) causes a restriction and cushions the end of the motion.

Failure of the check valve causes the cushioning not to function and requires the check valve to be replaced before the machine sustains damage. However, replacement of the check valve is, as described below, time-consuming and difficult.

The various mechanisms of a section of a machine of the individual section type are mounted on a section frame which resembles a box. The piston and cylinder assembly is mounted within the box on a base plate of the frame whereas the moulds are mounted above the top of the box which supports the pivot shaft of the mould portion supports, the operating rods passing through holes in the top. Other operating mechanisms of the section are mounted in other holes in the top. In the event of the failure of a check valve, a mechanic removes two of said other operating mechanisms so as to gain access to the interior of the frame through the holes normally occupied by said mechanisms, then he unbolts the cylinder from the base plate and the end cap from the cylinder, and then he maneuvres the end cap away from the cylinder, removes the broken check valve and inserts a replacement. The mechanic must then re-bolt the end cap to the cylinder, re-bolt the cylinder to the base plate, and replace the removed mechanisms. All this must be performed in difficult conditions and possibly with other sections of the machine operating on one or both sides of him. The exchange of such check valves is, thus, time-consuming and causes considerable production losses. There is also a possibility of accidently introducing dirt into the valve or cylinder during this difficult operation.

It is an object of the present invention to provide a mechanism of the type described in which the check valve can be more quickly and easily exchanged.

SUMMARY OF THE INVENTION

The invention provides a mechanism for opening and closing at least one mould of a glassware forming machine of the individual section type, the mechanism comprising a piston and cylinder assembly having a piston rod, mould side portion supports arranged to support opposed side portions of at least one mould and movable between mould closed positions in which the side portions cooperate in defining a mould cavity in which molten glass can be moulded, and mould open positions in which the side portions are separated, and a linkage system connecting said piston rod to said mould side portion supports arranged so that operation of the piston and cylinder assembly causes the supports to move between their mould open and mould closed positions, the cylinder assembly being connected to a source of fluid pressure and comprising check valve means arranged to allow fluid under pressure to flow along a passage into the cylinder, thus to cause the supports to be moved towards their mould closed positions, but to prevent exit of fluid through said passage, wherein the cylinder comprises an end cap and a cover member removably mounted on the end cap, the said source of fluid pressure being mounted on the end cap and connected to said passage which extends through the end cap, through the cover member and then again through the end cap into the cylinder, and the check valve means is positioned in a chamber defined partially by the end cap and partially by the cover member, which cover member may be removed to allow the check valve means to be replaced without disconnecting the cylinder from the source of fluid pressure.

In a mechanism according to the last preceding paragraph, a mechanic can remove the cover member and change the check valve without disturbing the end cap or the cylinder. The time involved can, thus, be considerably reduced as can the possibility of the introduction of dirt.

The check valve may be formed as a cartridge retained in the cover member by an O-ring. This enables the cover member to be removed, the cartridge "unplugged" from the cover member and another "plugged" in before it is replaced on the end cap.

Advantageously, the passage may divide into two or more branches within the closure member which pass through check valve means mounted in a chamber defined partially by said end cap and partially by said cover member. The use of a plurality of check valves enables a greater flow of air to be achieved and greater acceleration of the mould side portion supports. The passage may divide into a further branch within the cover member, said further branch communicating with a further passage extending longitudinally in the cylinder wall before entering the cylinder away from the end cap but within the thickness of the piston therefrom. This arrangement enables the motion of the piston towards the end cap to be cushioned as the further passage is closed by the piston as the piston approaches the end cap thereby cutting off exhaust from the cylinder between the end cap and the piston.

BRIEF DESCRIPTION OF THE DRAWINGS

There now follows a detailed description to be read with reference to the accompanying drawing, of a mechanism for opening and closing at least one mould of a glassware forming machine of the individual section type which is illustrative of the invention, it is to be understood that the illustrative mechanism has been selected for description by way of example and not of limitation of the invention.

The drawing is an end view with parts broken away of an end cap of a piston and cylinder assembly of the illustrative mechanism.

DETAILED DESCRIPTION OF THE INVENTION

The illustrative mechanism is for opening and closing at least one mould of a glassware forming machine of the individual section type. The mechanism is generally similar to that described in U.S. Pat. No. 1 911 119 and discussed above.

The illustrative mechanism comprises a piston and cylinder assembly having an end cap 60 and a piston rod 32 which, as described above, is connected to mould side portion supports (not shown) by a linkage system (not shown) so that operation of the assembly causes the supports to move between their mould open and mould closed positions. The end cap 60 is secured to the cylinder (not shown) of the assembly by four bolts 62. An airs supply or exhaust pipe 29 is secured to the end cap 60 by a fitting 64.

The fitting 64 is mounted in an opening of a passage 66 which leads into the cylinder. Check valve means is mounted in the passage 66 and arranged to allow air under pressure to enter the cylinder through the passage 66 to cause the supports to be moved towards their mould closed positions but to prevent exit of air through said passage. A cover member 67 is removably mounted on top of the end cap 60 being secured to an upper surface 68 of the end cap by four bolts 70 (only two visible in the drawing).

The passage 66 comprises a horizontal portion 66a in the end cap 60 and in which the fitting 64, is mounted a vertical portion 66b connecting the portion 66a to an opening in the upper surface 68 of the end cap 60, a vertical portion 66c in the cover member 67 connecting with the opening in the surface 68, a horizontal portion 66d in the cover member 67 connecting with the portion 66c, a vertical portion 66e connecting with the portion 66d, a cylindrical chamber 66f defined partially by the end cap 60 and partially by the cover member 67 and entered by the passage portion 66e, a vertical portion 66g extending downwardly in the end cap 60 from the chamber 66f and connecting therewith, and a horizontal portion 66h in the end cap 60 connecting with the portion 66g and entering the cylinder longitudinally.

The check valve means of the illustrative mechanism is mounted in the chamber 66f and comprises a hollow cylindrical casing 72 open at the bottom end and having an internal flange 74 at the top end defining an entrance hole 76. The casing 72 contains a spring washer 78 mounted in a recess near the bottom end of the casing 72, a ball 80, and a spring 82 acting between the washer 78 and the ball 80 to urge the ball 80 against the flange 74 to close the hole 76. Thus, the passage 66 extends through the end cap 60 and the removable cover member 67, first entering the end cap 60, then passing into the cover member 67, and then re-entering the end cap 60 before entering the cylinder. Furthermore, when air under pressure is applied to the pipe 29, the ball 80 is displaced against the action of the spring 82 and air can enter the cylinder by passing through the passage portions 66a, 66b, 66c, 66d, 66e, 66g and 66h and the casing 72 in the chamber 66f. The check valve means, thus, comprises a closure member in the form of the ball 80 and resilient means in the form of the spring 82 urging the ball 80 into a position in which it closes the passage 66 and the ball 80 is displacable against the action of the spring 82 by air pressure in the passage 66 to allow air to pass into the cylinder.

An O-ring 84 is mounted in an external recess in the casing 72 and serves to lightly retain the casing 72 in the cover member 67. The check valve means is, thus, formed as a cartridge retained in the cover member 67 by the O-ring 84. When the cover member 67 is removed from the end cap 60, the check valve means can be removed by pulling the casing 72 out of the portion of the chamber 66f defined by the cover member 67 and replaced by inserting another casing in said chamber portion before re-mounting the cover member 67 on the end cap 60 ensuring that the casing 72 enters the portion of the chamber 66f defined by the end cap 60.

The passage 66 may divide into two or more branches within the cover member 67 which pass through check valve means mounted in a chamber (similar to the chamber 66f) defined partially by the end cap 60 and partially by the cover member 67. The drawing shows one such branch 86 which comprises a vertical passage portion 86a in the cover member 67 connecting the passage portion 66d to a chamber 86b similar to the chamber 66f and containing similar check valve means in a casing 88 similar to the casing 72. The branch 86 also comprises a vertical passage portion 86c in the end cap 60 connecting with the chamber 86b, and a horizontal passage portion 86d connecting with the portion 86c and entering the cylinder longitudinally. When the cover member 67 is removed, the check valve means in both chambers 66f and 86b can be exchanged.

The passage 66 divides into a further branch 90 within the cover member 67, said further branch communicating with a further passage (not shown) extending longitudinally in the cylinder wall before entering the cylinder away from the end cap 60 but within the thickness of the piston therefrom. The branch 90 comprises a vertical passage portion 90a in the cover member 67 connecting with the passage portion 66d, a vertical passage portion 90b in the end cap 60 connecting with the portion 90a, and a horizontal passage portion 90c in the end cap 60 connecting the portion 90b in the aforementioned further passage in the cylinder wall. The further passage provides cushioning as it is closed as the piston approaches the end cap 60.

We claim:

1. A mechanism for opening and closing a mold of an individual section glass forming machine comprising a piston and cylinder assembly including manifold means for delivering pressurized air from an external source into the assembly and for exhausting air from the assembly to the atmosphere including
    an end cap having a first surface and a second surface,
        a first intake air conduit communicating with said first surface and a second intake air conduit extending between said first and second surfaces,
    air supply means including a fitting secured within said second intake air conduit at said second surface,
    a cover member having an air conduit for connecting said second intake air conduit at said first surface with said first intake air conduit at said first surface,
    means for securing said cover member on said end cap,
    a check valve,
    said cover member air conduit having a portion selectively sized proximate the first intake air conduit at said first surface to receive said check valve and means for removably securing said check valve within the check valve receiving portion of said cover member conduit so that the check valve can be replaced by taking the cover member off of said end cap and removing said check valve from said cover member.

2. A mechanism according to claim 1 wherein said first intake air conduit includes a portion selectively sized proximate said first surface to partially receive said check valve when said cover member is secured to said end cap.

* * * * *